United States Patent
Nguyen et al.

(10) Patent No.: US 11,197,203 B2
(45) Date of Patent: Dec. 7, 2021

(54) ADAPTIVE CONTROL EXCLUSION CONFIGURATION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Arjun Bharadwaj, Cupertino, CA (US); Kapil Gulati, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/863,564

(22) Filed: Apr. 30, 2020

(65) Prior Publication Data
US 2020/0351719 A1 Nov. 5, 2020

Related U.S. Application Data

(60) Provisional application No. 62/842,875, filed on May 3, 2019.

(51) Int. Cl.
*H04W 28/26* (2009.01)
*H04W 28/02* (2009.01)
(Continued)

(52) U.S. Cl.
CPC ....... *H04W 28/26* (2013.01); *H04W 28/0268* (2013.01); *H04W 72/02* (2013.01); *H04W 72/087* (2013.01); *H04W 88/06* (2013.01)

(58) Field of Classification Search
CPC ............ H04W 28/26; H04W 28/0268; H04W 28/0263; H04W 88/06; H04W 72/087;
(Continued)

(56) References Cited

U.S. PATENT DOCUMENTS

2017/0192451 A1* 7/2017 Choi ..................... B60K 37/02
2019/0075548 A1* 3/2019 Lee ..................... H04W 72/044
(Continued)

FOREIGN PATENT DOCUMENTS

EP 3468268 A1 4/2019
WO 2018145067 A1 8/2018

OTHER PUBLICATIONS

Fujitsu; "Resource Allocation for NR V2X Sidelink Communication"; 3GPP TSG RAN WG1 Meeting #95; Nov. 12-16, 2018; pp. 1-9; R1-1812410.
(Continued)

*Primary Examiner* — Robert C Scheibel
(74) *Attorney, Agent, or Firm* — Harrity & Harrity, LLP (57) ABSTRACT

Various aspects of the present disclosure generally relate to wireless communication. In some aspects, a user equipment (UE) may determine a plurality of ratios of free resources in a historical time window using respective control exclusion parameters corresponding to the plurality of ratios of free resources. The UE may determine a particular control exclusion parameter based at least in part on a ratio of free resources, of the plurality of ratios of free resources, satisfying a threshold. The UE may select a resource for a future transmission based at least in part on the particular control exclusion parameter. The UE may reserve the selected resource. Numerous other aspects are provided.

30 Claims, 4 Drawing Sheets

(51) Int. Cl.
  *H04W 88/06* (2009.01)
  *H04W 72/08* (2009.01)
  *H04W 72/02* (2009.01)
(58) Field of Classification Search
  CPC . H04W 72/02; H04W 72/0486; H04W 16/14; H04W 52/146; H04W 52/283; H04L 5/0094
  See application file for complete search history.

(56) References Cited

U.S. PATENT DOCUMENTS

| | | | |
|---|---|---|---|
| 2020/0029245 A1* | 1/2020 | Khoryaev | H04W 4/46 |
| 2020/0068534 A1* | 2/2020 | Li | H04L 5/0044 |
| 2020/0275411 A1* | 8/2020 | Tang | H04W 72/02 |
| 2020/0280961 A1* | 9/2020 | Lee | H04W 4/40 |
| 2020/0288473 A1* | 9/2020 | Li | H04L 5/00 |

OTHER PUBLICATIONS

International Search Report and Written Opinion—PCT/US2020/030982—ISA/EPO—dated Jul. 21, 2020.

\* cited by examiner

ADAPTIVE CONTROL EXCLUSION CONFIGURATION

CROSS-REFERENCE TO RELATED APPLICATION

This Patent Application claims priority to U.S. Provisional Patent Application No. 62/842,875, filed on May 3, 2019, entitled "ADAPTIVE CONTROL EXCLUSION CONFIGURATION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for an adaptive control exclusion (CE) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a plurality of ratios of free resources in a historical time window using respective control exclusion parameters corresponding to the plurality of ratios of free resources; determining a particular control exclusion parameter based at least in part on a ratio of free resources, of the plurality of ratios of free resources, satisfying a threshold; selecting a resource for a future transmission based at least in part on the particular control exclusion parameter; and reserving the selected resource for the future transmission.

In some aspects, a UE for wireless communication may include memory and one or more processors operatively coupled to the memory. The memory and the one or more processors may be configured to determine a plurality of ratios of free resources in a historical time window using respective control exclusion parameters corresponding to the plurality of ratios of free resources; determine a particular control exclusion parameter based at least in part on a ratio of free resources, of the plurality of ratios of free resources, satisfying a threshold; select a resource for a future transmission based at least in part on the particular control exclusion parameter; and reserve the selected resource for the future transmission.

In some aspects, a non-transitory computer-readable medium may store one or more instructions for wireless communication. The one or more instructions, when executed by one or more processors of a UE, may cause the one or more processors to: determine a plurality of ratios of free resources in a historical time window using respective control exclusion parameters corresponding to the plurality of ratios of free resources; determine a particular control exclusion parameter based at least in part on a ratio of free resources, of the plurality of ratios of free resources, satisfying a threshold; select a resource for a future transmission based at least in part on the particular control exclusion parameter; and reserve the selected resource for the future transmission.

In some aspects, an apparatus for wireless communication may include means for determining a plurality of ratios of free resources in a historical time window using respective control exclusion parameters corresponding to the plurality of ratios of free resources; means for determining a particular control exclusion parameter based at least in part on a ratio of free resources, of the plurality of ratios of free resources, satisfying a threshold; means for selecting a resource for a future transmission based at least in part on the particular control exclusion parameter; and means for reserving the selected resource for the future transmission.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
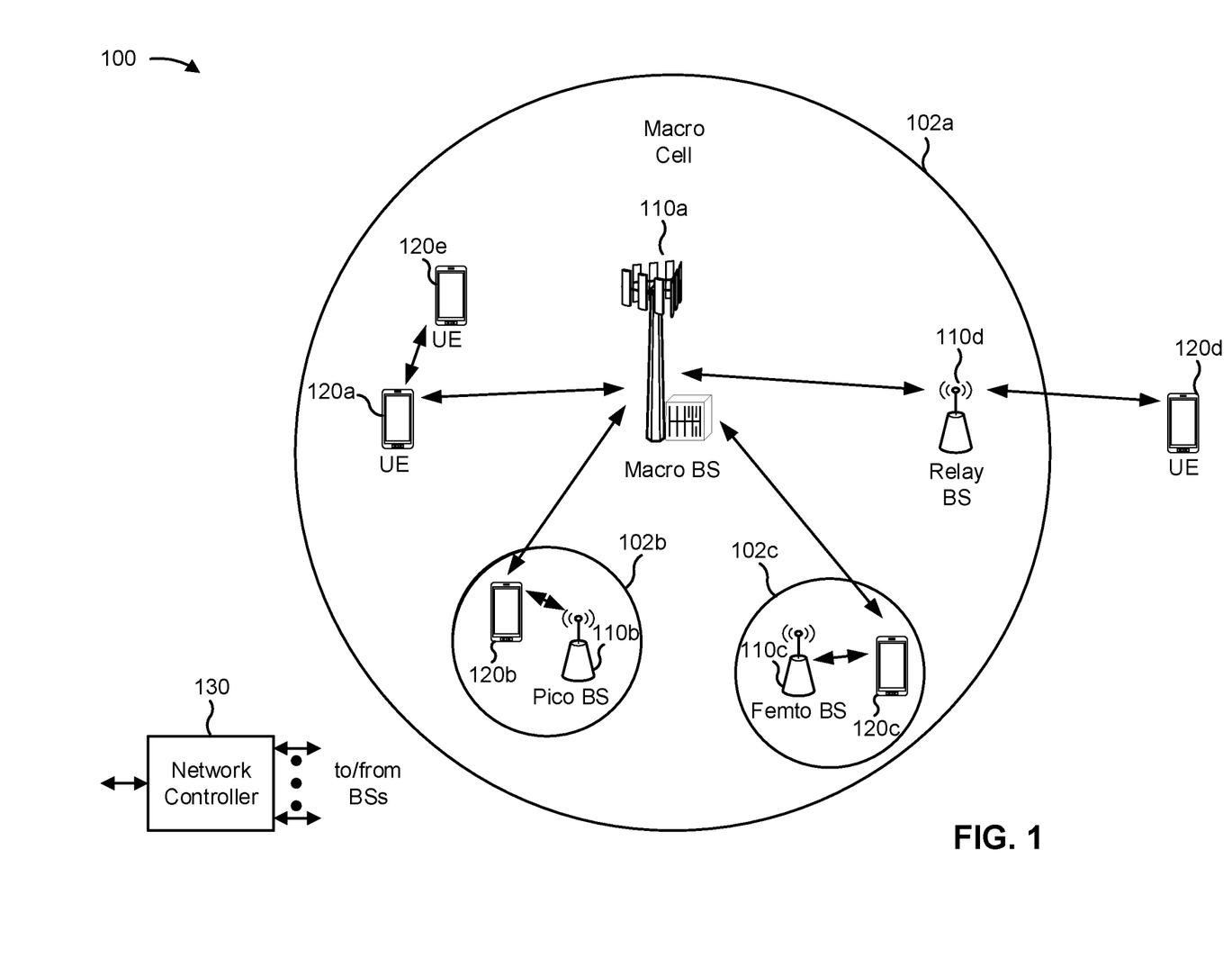
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
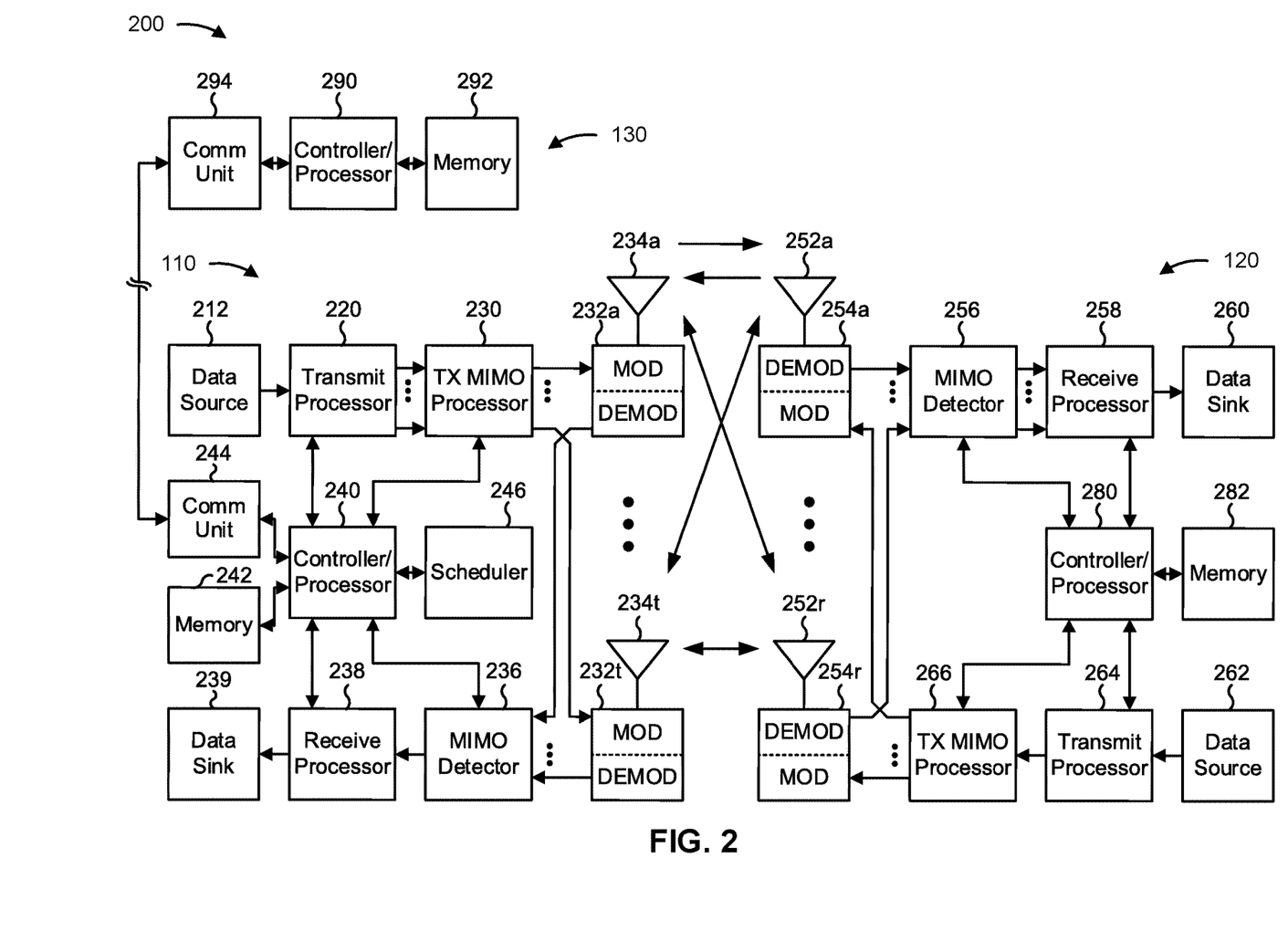
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with an adaptive control exclusion parameter, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a plurality of ratios of free resources in a historical time window using respective control exclusion parameters corresponding to the plurality of ratios of free resources; means for selecting a particular control exclusion parameter based at least in part on a ratio of free resources, of the plurality of ratios of free resources, satisfying a threshold; means for determining a particular control exclusion parameter based at least in part on a ratio of free resources, of the plurality of ratios of free resources, satisfying a threshold; means for reserving a resource for a future transmission based at least in part on the particular control exclusion parameter; means for selecting a resource for a future transmission based at least in part on the particular control exclusion parameter; means for reserving the selected resource for the future transmission; means for determining multiple ratios corresponding to respective sub-windows of the historical time window; means for determining the particular ratio based at least in part on the multiple ratios; means for determining that no resource is available for the future transmission in a first interval; means for reserving the resource in a second interval after the first interval based at least in part on no resource being available in the first interval; and/or the like. In some aspects, such means may include one or more components of UE 120 described in connection with FIG. 2.

As indicated above, FIG. 2 is provided as an example. Other examples may differ from what is described with regard to FIG. 2.

In some communications systems, such as systems using 5G/NR, UEs may communicate with other UEs using sidelink communications. For example, in vehicle-to-everything (V2X) communications, a first UE may communicate with a second UE using a distributed channel access mechanism. In a distributed channel access mechanism, the UEs may select time resources, frequency resources, and/or the like for communication based at least in part on a decentralized medium access control (MAC) protocol and without a central scheduling unit providing scheduling information. A UE may identify resources based at least in part on a control exclusion (CE) parameter. The CE parameter may identify a range (e.g., a distance, a power level, and/or the like). The UE may respect resource reservations of UEs within the range identified by the CE parameter, and may disregard resource reservations of UEs outside the range identified by the CE parameter. A CE parameter that is too wide (e.g., a large distance or a low power level) may lead to difficulty in reserving resources, whereas a CE parameter that is too narrow (e.g., a small distance or a high power level) may cause other UEs not to respect the UE's reservations, thus decreasing the transmit distance of the UE. For example, the other UEs may have knowledge of the UE's CE parameter and may only respect the UE's resource reservations within the radius defined by the UE's CE parameter.

Some techniques and apparatuses described herein provide scheduling of communications based at least in part on an adjustable CE parameter. The CE parameter may be adjusted based at least in part on a historical time window. For example, a UE may measure ratios of free resources in the historical time window using multiple, different CE parameters. The UE may select a CE parameter based at least in part on the ratios of free resources, as described in more detail elsewhere herein. The UE may reserve a resource for a future transmission in accordance with the selected CE parameter. In this way, the UE may predict future resource usage based at least in part on a CE window, and may select a CE window that provides a balance between resource availability and transmission range of the UE. This improves the likelihood that other UEs respect the UE's CE parameter, and increases throughput of the UE.

Figure 3:
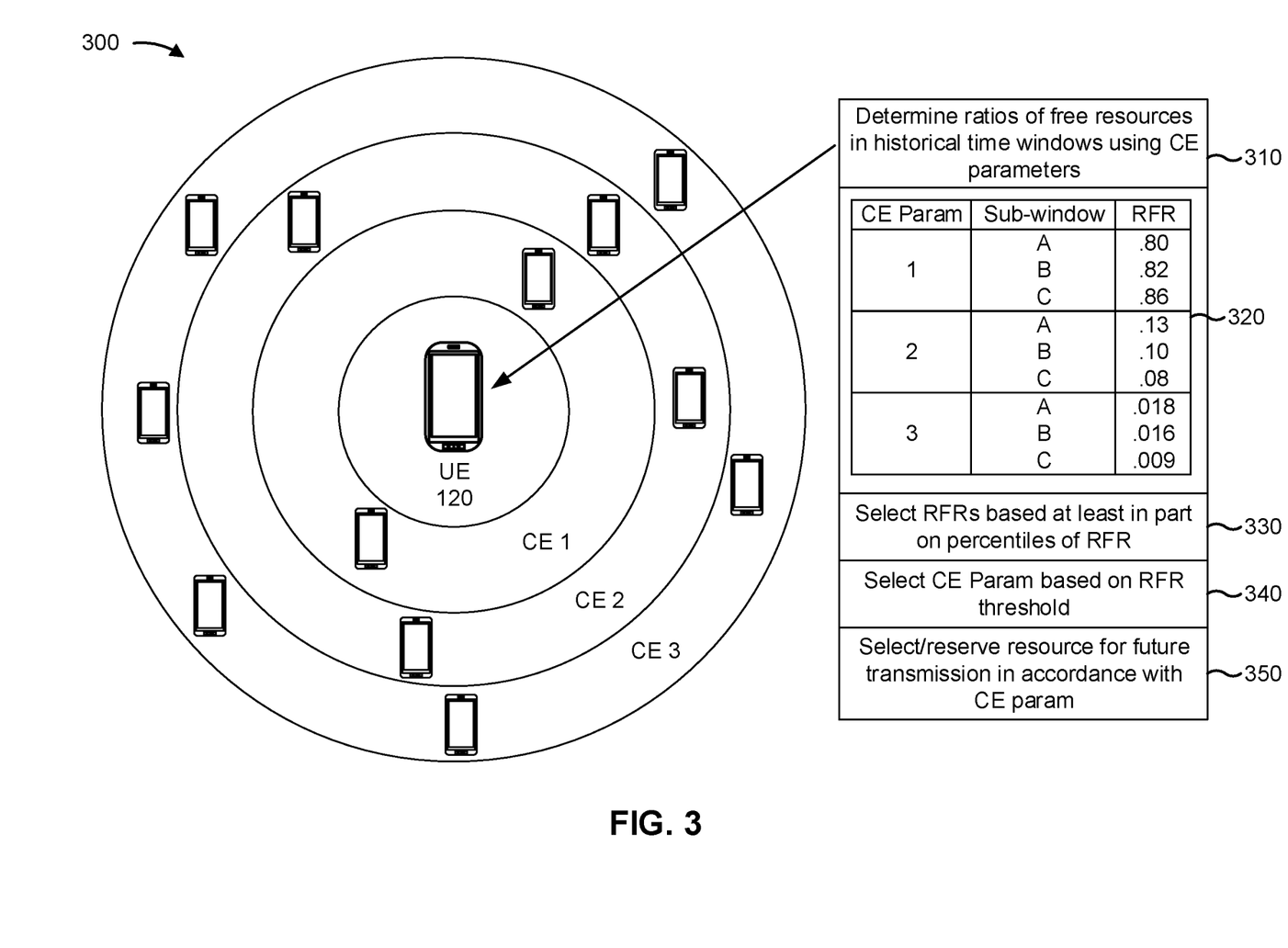
FIG. 3 is a diagram illustrating an example of reserving a resource using an adjustable CE parameter, in accordance with various aspects of the present disclosure.

FIG. 3 is a diagram illustrating an example 300 of reserving a resource using an adjustable CE parameter, in accordance with various aspects of the present disclosure. As shown, example 300 includes a UE 120 and other UEs at various ranges from the UE 120. In some aspects, the UE 120 may be associated with a V2X deployment. However, the techniques and apparatuses described herein are not limited to those involving V2X deployments.

As shown by reference number 310, the UE 120 may determine a plurality of ratios of free resources (RFRs) in a historical time window using a respective plurality of CE parameters (shown as CE 1, CE 2, and CE 3). The plurality of RFRs are shown by reference number 320. An RFR may identify a ratio of resources that are not reserved for a UE to resources that are reserved for a UE. For example, a resource that is not reserved for a UE may include a resource that no UE has reserved, a resource that no UE within UE 120's CE parameter range has reserved, or a resource that is reserved by a UE that is outside of the UE's CE parameter range. Here, the UE 120 identifies RFRs of 0.80, 0.82, and 0.86 for CE 1, 0.13, 0.10, and 0.08 for CE 2, and 0.018, 0.016, and 0.009 for CE 3. In some aspects, the UE 120 determines RFRs for multiple sub-windows, as described in more detail below.

The UE 120 may determine the plurality of RFRs in a historical time window. The historical time window may include a period of time preceding the UE 120's determination of the plurality of RFRs, and may be of any length. A shorter historical time window may simplify determination of the RFR, thereby reducing computing resource consumption of the UE 120, whereas a longer historical time window may provide a larger body of data from which to determine RFRs, thereby potentially increasing the accuracy of predictions using the RFRs.

In some aspects, the UE 120 may determine RFRs for multiple sub-windows, as shown. For example, the historical time window may be divided into multiple sub-windows. In some aspects, a length of a sub-window may be a multiple of a transmission time interval (TTI) of UE 120. For example, a sub-window may be of length X TTIs, wherein X is an integer. As one example, X may be equal to 16. As another example, X may be based at least in part on a soft buffer limit of the UE 120. The determination of the RFRs for the multiple sub-windows may improve accuracy of determination of a CE value, as described in more detail elsewhere herein.

As shown by reference number 330, the UE 120 may select RFRs for the CE parameters based at least in part on percentiles associated with the plurality of RFRs. For example, the UE 120 may select an RFR based at least in part on a pre-configured threshold percentile for a given quality of service (QoS) level. In some aspects, different QoS levels may be associated with different threshold percentiles, and the UE 120 may use a threshold percentile corresponding to a QoS level for which the UE 120 is to select an appropriate CE parameter. As an example, when the pre-configured threshold percentile is 70%, the UE 120 may select an RFR at the $70^{th}$ percentile of RFR values collected for sub-windows of the historical measurement window. In some aspects, the UE 120 may combine multiple sub-window RFR measurements. For example, the UE 120 may determine an average of multiple RFR measurements, a weighted average (e.g., a time-weighted average, a proximity-weighted average) of multiple RFR measurements, and/or the like.

As shown by reference number 340, the UE 120 may select a CE parameter based at least in part on the RFRs (e.g., the selected RFRs described in connection with reference numbers 320 and 330). For example, the UE 120 may select a CE parameter associated with an RFR value that satisfies a threshold. In this case, if the threshold is less than 0.2, then the UE 120 may select CE 2, since CE 2 is the first CE parameter that satisfies the threshold. In some aspects, the UE 120 may select multiple, different CE parameters. For example, the UE 120 may select different CE parameters for different QoS levels, thereby enabling the satisfaction of different QoS levels for V2X communication.

As shown by reference number 350, the UE 120 may select a resource for future transmissions in accordance with the selected CE parameter. In some aspects, the UE 120 may reserve the resource for future transmission. For example, the UE 120 may use the selected CE parameter to identify available resources, and may select one or more available resources for the future transmission. The UE 120 may reserve the one or more selected resources by transmitting an indication that the UE 120 has reserved the one or more selected resources. In some aspects, the UE 120 may select the one or more available resources based at least in part on a different sweep than the sweep used to determine the selected CE parameter. For example, the UE 120 may perform a first sweep to determine a selected CE parameter, and may subsequently perform another sweep to identify unreserved resources for the future transmission. In other words, the UE 120 may not use a resource identified as part of the CE parameter selection process for the future transmission. In some aspects, when no resource is available in a first interval for the future transmission, the UE 120 may select and/or reserve a resource in a second interval for a future transmission.

As indicated above, FIG. 3 is provided as an example. Other examples may differ from what is described with respect to FIG. 3.

Figure 4:
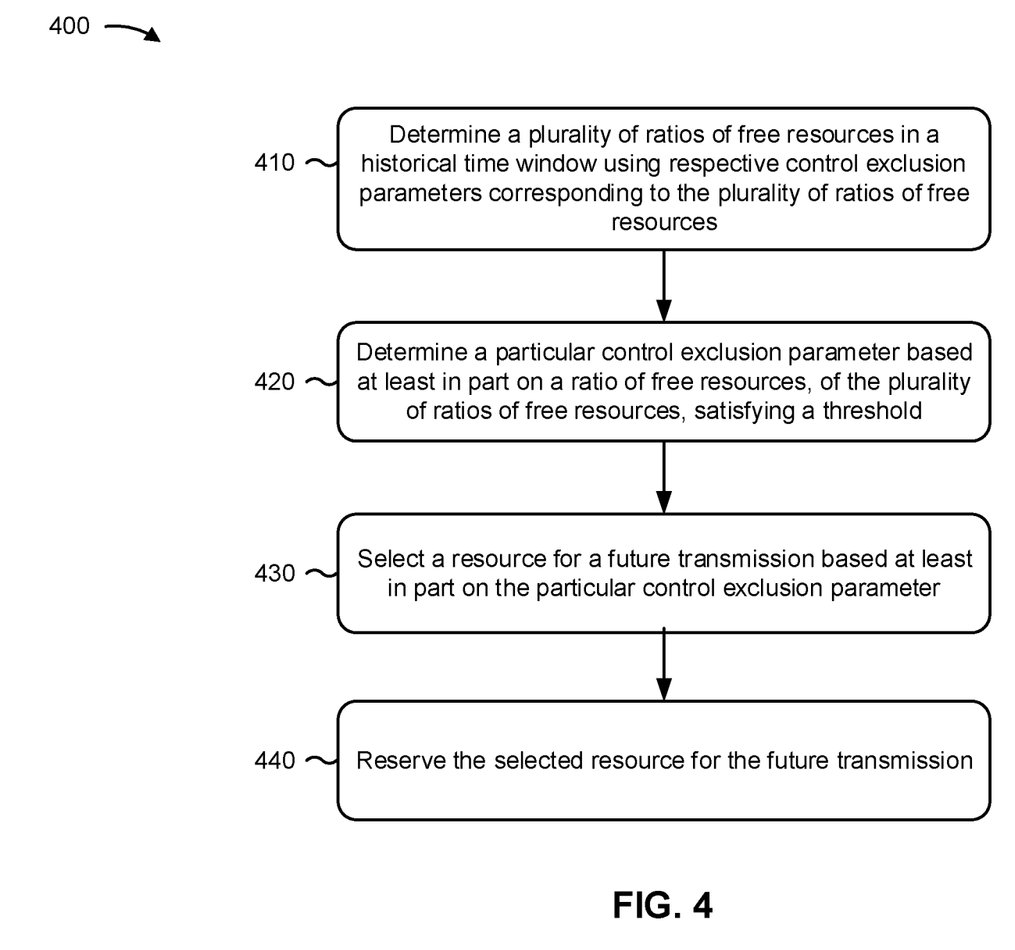
FIG. 4 is a diagram illustrating an example process performed, for example, by a user equipment, in accordance with various aspects of the present disclosure.

FIG. 4 is a diagram illustrating an example process 400 performed, for example, by a user equipment, in accordance with various aspects of the present disclosure. Example process 400 is an example where a UE (e.g., user equipment 120 and/or the like) performs operations associated with adaptive control exclusion configuration.

As shown in FIG. 4, in some aspects, process 400 may include determining a plurality of ratios of free resources in a historical time window using respective control exclusion parameters corresponding to the plurality of ratios of free resources (block 410). For example, the UE (e.g., using antenna 252, DEMOD 254, MIMO detector 256, receive processor 258, controller/processor 280, and/or the like) may determine a plurality of ratios of free resources in a historical time window using respective control exclusion parameters corresponding to the plurality of ratios of free resources, as described above. The respective control exclusion parameters may have a one-to-one or one-to-many relationship with the plurality of ratios of free resources. For example, a given control exclusion parameter may be used to determine one or more ratios of free resources.

As further shown in FIG. 4, in some aspects, process 400 may include determining a particular control exclusion parameter based at least in part on a ratio of free resources, of the plurality of ratios of free resources, satisfying a threshold (block 420). For example, the UE (e.g., using controller/processor 280 and/or the like) may determine a particular control exclusion parameter based at least in part on a ratio of free resources, of the plurality of ratios of free resources, satisfying a threshold, as described above.

As further shown in FIG. 4, in some aspects, process 400 may include selecting a resource for a future transmission based at least in part on the particular control exclusion parameter (block 430). For example, the UE (e.g., using controller/processor 280, transmit processor 264, TX MIMO processor 266, MOD 254, antenna 252, and/or the like) may select a resource for a future transmission based at least in part on the particular control exclusion parameter, as described above.

As further shown in FIG. 4, in some aspects, process 400 may include reserving the selected resource for the future transmission (block 440). For example, the UE (e.g., using controller/processor 280, transmit processor 264, TX MIMO processor 266, MOD 254, antenna 252, and/or the like) may reserve the selected resource for the future transmission, as described above.

Process 400 may include additional aspects, such as any single aspect or any combination of aspects described below and/or in connection with one or more other processes described elsewhere herein.

In a first aspect, the plurality of ratios of free resources are determined based at least in part on free resources detected by the UE, wherein a resource is considered a free resource when a physical distance of a UE that reserved the resource or a power level associated with the resource is outside of a range specified by a corresponding control exclusion parameter.

In a second aspect, alone or in combination with the first aspect, the respective control exclusion parameters define respective distances.

In a third aspect, alone or in combination with one or more of the first and second aspects, the respective control exclusion parameters define respective power levels.

In a fourth aspect, alone or in combination with one or more of the first through third aspects, for a particular ratio of free resources, determining the plurality of ratios of free resources in the historical time window further comprises determining multiple ratios corresponding to respective sub-windows of the historical time window and determining the particular ratio based at least in part on the multiple ratios.

In a fifth aspect, alone or in combination with one or more of the first through fourth aspects, determining the particular ratio comprises selecting a ratio, of the multiple ratios, as the particular ratio based at least in part on a pre-configured threshold percentile for a given quality of service (QoS) level.

In a sixth aspect, alone or in combination with one or more of the first through fifth aspects, the particular ratio is determined based at least in part on combining the multiple ratios.

In a seventh aspect, alone or in combination with one or more of the first through sixth aspects, the respective sub-windows are defined based at least in part on a multiple of a transmission time interval of the UE.

In an eighth aspect, alone or in combination with one or more of the first through seventh aspects, the plurality of ratios of free resources are determined for an entirety of the historical time window as a single window.

In a ninth aspect, alone or in combination with one or more of the first through eighth aspects, reserving the resource for the future transmission further comprises: determining that no resource is available for the future transmission in a first interval; and reserving the resource in a second interval after the first interval based at least in part on no resource being available in the first interval.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a plurality of ratios of free resources in a historical time window using respective control exclusion parameters corresponding to the plurality of ratios of free resources,
        wherein a particular ratio of free resources, of the plurality of ratios of free resources, is based at least in part on multiple ratios of free resources corresponding to respective sub-windows of the historical time window;
    determining a particular control exclusion parameter, of the respective control exclusion parameters, based at least in part on a ratio of free resources, of the plurality of ratios of free resources, satisfying a threshold;
    selecting a resource for a future transmission based at least in part on the particular control exclusion parameter; and
    reserving the selected resource for the future transmission.

2. The method of claim 1, wherein the plurality of ratios of free resources are determined based at least in part on free resources detected by the UE, wherein a resource is considered a free resource when a physical distance of a UE that reserved the resource or a power level associated with the resource is outside of a range specified by a corresponding control exclusion parameter.

3. The method of claim 1, wherein the respective control exclusion parameters define respective distances.

4. The method of claim 1, wherein the respective control exclusion parameters define respective power levels.

5. The method of claim 1, wherein, for the particular ratio of free resources, determining the plurality of ratios of free resources in the historical time window further comprises:
determining the multiple ratios of free resources corresponding to the respective sub-windows of the historical time window; and
determining the particular ratio of free resources based at least in part on the multiple ratios of free resources.

6. The method of claim 5, wherein determining the particular ratio of free resources comprises:
selecting a ratio of free resources, of the multiple ratios of free resources, as the particular ratio of free resources based at least in part on a pre-configured threshold percentile for a given quality of service (QoS) level.

7. The method of claim 5, wherein the particular ratio of free resources is determined based at least in part on combining the multiple ratios of free resources.

8. The method of claim 5, wherein the respective sub-windows are defined based at least in part on a multiple of a transmission time interval of the UE.

9. The method of claim 1, wherein the plurality of ratios of free resources are determined for an entirety of the historical time window as a single window.

10. The method of claim 1, wherein reserving the resource for the future transmission further comprises:
determining that no resource is available for the future transmission in a first interval; and
reserving the resource in a second interval after the first interval based at least in part on no resource being available in the first interval.

11. A user equipment (UE) for wireless communication, comprising:
a memory; and
one or more processors operatively coupled to the memory, the memory and the one or more processors configured to:
determine a plurality of ratios of free resources in a historical time window using respective control exclusion parameters corresponding to the plurality of ratios of free resources,
wherein a particular ratio of free resources, of the plurality of ratios of free resources, is based at least in part on multiple ratios of free resources corresponding to respective sub-windows of the historical time window;
determine a particular control exclusion parameter, of the respective control exclusion parameters, based at least in part on a ratio of free resources, of the plurality of ratios of free resources, satisfying a threshold;
select a resource for a future transmission based at least in part on the particular control exclusion parameter; and
reserve the selected resource for the future transmission.

12. The UE of claim 11, wherein the plurality of ratios of free resources are determined based at least in part on free resources detected by the UE, wherein a resource is considered a free resource when a physical distance of a UE that reserved the resource or a power level associated with the resource is outside of a range specified by a corresponding control exclusion parameter.

13. The UE of claim 11, wherein the respective control exclusion parameters define respective distances.

14. The UE of claim 11, wherein the respective control exclusion parameters define respective power levels.

15. The UE of claim 11, wherein, for the particular ratio of free resources, the one or more processors, when determining the plurality of ratios of free resources in the historical time window, are further configured to:
determine the multiple ratios of free resources corresponding to the respective sub-windows of the historical time window; and
determine the particular ratio of free resources based at least in part on the multiple ratios of free resources.

16. The UE of claim 15, wherein the one or more processors, when determining the particular ratio, are further to:
select a ratio of free resources, of the multiple ratios of free resources, as the particular ratio of free resources based at least in part on a pre-configured threshold percentile for a given quality of service (QoS) level.

17. The UE of claim 15, wherein the particular ratio of free resources is determined based at least in part on combining the multiple ratios of free resources.

18. The UE of claim 15, wherein the respective sub-windows are defined based at least in part on a multiple of a transmission time interval of the UE.

19. The UE of claim 11, wherein the plurality of ratios of free resources are determined for an entirety of the historical time window as a single window.

20. The UE of claim 11, wherein the one or more processors, when reserving the resource for the future transmission, are further configured to:
determine that no resource is available for the future transmission in a first interval; and
reserve the resource in a second interval after the first interval based at least in part on no resource being available in the first interval.

21. A non-transitory computer-readable medium storing one or more instructions for wireless communication, the one or more instructions comprising:
one or more instructions that, when executed by one or more processors of a user equipment (UE), cause the one or more processors to:
determine a plurality of ratios of free resources in a historical time window using respective control exclusion parameters corresponding to the plurality of ratios of free resources,
wherein a particular ratio of free resources, of the plurality of ratios of free resources, is based at least in part on multiple ratios of free resources corresponding to respective sub-windows of the historical time window;
determine a particular control exclusion parameter, of the respective control exclusion parameters, based at least in part on a ratio of free resources, of the plurality of ratios of free resources, satisfying a threshold;
select a resource for a future transmission based at least in part on the particular control exclusion parameter; and
reserve the selected resource.

22. The non-transitory computer-readable medium of claim 21, wherein the plurality of ratios of free resources are determined based at least in part on free resources detected by the UE, wherein a resource is considered a free resource when a physical distance of a UE that reserved the resource or a power level associated with the resource is outside of a range specified by a corresponding control exclusion parameter.

23. The non-transitory computer-readable medium of claim 21, wherein the respective control exclusion parameters define respective distances.

24. The non-transitory computer-readable medium of claim 21, wherein the respective control exclusion parameters define respective power levels.

25. The non-transitory computer-readable medium of claim 21, wherein, for a particular ratio of free resources, the one or more instructions, that cause the one or more processors to determine the plurality of ratios of free resources in the historical time window, further cause the one or more processors to:
   determine the multiple ratios of free resources corresponding to the respective sub-windows of the historical time window; and
   determine the particular ratio of free resources based at least in part on the multiple ratios of free resources.

26. The non-transitory computer-readable medium of claim 25, wherein the one or more instructions, that cause the one or more processors to determine the particular ratio, further cause the one or more processors to:
   select a ratio of free resources, of the multiple ratios of free resources, as the particular ratio of free resources based at least in part on a pre-configured threshold percentile for a given quality of service (QoS) level.

27. An apparatus for wireless communication, comprising:
   means for determining a plurality of ratios of free resources in a historical time window using respective control exclusion parameters corresponding to the plurality of ratios of free resources,
      wherein a particular ratio of free resources, of the plurality of ratios of free resources, is based at least in part on multiple ratios of free resources corresponding to respective sub-windows of the historical time window;
   means for determining a particular control exclusion parameter, of the respective control exclusion parameters, based at least in part on a ratio of free resources, of the plurality of ratios of free resources, satisfying a threshold;
   means for selecting a resource for a future transmission based at least in part on the particular control exclusion parameter; and
   means for reserving the selected resource.

28. The apparatus of claim 27, wherein the plurality of ratios of free resources are determined based at least in part on free resources detected by the apparatus, wherein a resource is considered a free resource when a physical distance of a user equipment that reserved the resource or a power level associated with the resource is outside of a range specified by a corresponding control exclusion parameter.

29. The apparatus of claim 27, wherein the respective control exclusion parameters define respective distances.

30. The apparatus of claim 27, wherein the respective control exclusion parameters define respective power levels.

* * * * *